United States Patent
Yuen et al.

(10) Patent No.: US 6,721,015 B2
(45) Date of Patent: Apr. 13, 2004

(54) SOUND BITE AUGMENTATION

(75) Inventors: Henry C. Yuen, Pasadena, CA (US);
Elsie Y. Leung, South Pasadena, CA (US); Eric T Shalkey, Methuen, MA (US)

(73) Assignee: E Guide, Inc., Beverly Hills, CA (US)

( * ) Notice: Subject to any disclaimer, the term of this patent is extended or adjusted under 35 U.S.C. 154(b) by 0 days.

(21) Appl. No.: 10/202,186

(22) Filed: Jul. 24, 2002

(65) Prior Publication Data

US 2002/0180889 A1 Dec. 5, 2002

Related U.S. Application Data

(63) Continuation of application No. 09/219,574, filed on Dec. 24, 1998, now Pat. No. 6,452,640.
(60) Provisional application No. 60/068,782, filed on Dec. 24, 1997.

(51) Int. Cl.[7] ........................ H04N 7/00; H04N 11/00; H04N 9/74
(52) U.S. Cl. ....................... 348/460; 348/468; 348/553; 348/569; 348/473; 348/478; 348/462; 348/467
(58) Field of Search ................................. 348/460–462, 348/467, 468, 552–3, 589, 473–4, 478, 906, 722, 723, 569

(56) References Cited

U.S. PATENT DOCUMENTS

| | | | |
|---|---|---|---|
| 5,097,326 A | | 3/1992 | Meijer |
| 5,353,121 A | | 10/1994 | Young et al. |
| 5,404,393 A | | 4/1995 | Remillard |
| 5,408,333 A | * | 4/1995 | Kojima ........................ 358/400 |
| 5,523,796 A | | 6/1996 | Marshall et al. |
| 5,585,838 A | * | 12/1996 | Lawler et al. ................. 725/54 |
| 5,619,249 A | | 4/1997 | Billock et al. |
| 5,677,739 A | * | 10/1997 | Kirkland ..................... 348/468 |
| 5,710,601 A | | 1/1998 | Marshall et al. |
| 5,774,857 A | | 6/1998 | Newlin |
| 5,793,438 A | * | 8/1998 | Bedard ........................ 348/569 |
| 5,801,747 A | * | 9/1998 | Bedard ......................... 725/46 |
| 5,805,235 A | * | 9/1998 | Bedard ........................ 348/569 |
| 5,819,032 A | * | 10/1998 | de Vries et al. ............ 709/250 |
| 5,900,908 A | | 5/1999 | Kirkland |
| 5,907,323 A | | 5/1999 | Lawler et al. |
| 5,953,066 A | * | 9/1999 | Yun ............................ 348/485 |
| 5,956,458 A | * | 9/1999 | Sezan et al. ................... 386/95 |
| 5,956,685 A | | 9/1999 | Tenpaku et al. |
| 6,005,631 A | | 12/1999 | Anderson et al. |
| 6,008,802 A | | 12/1999 | Iki et al. |
| 6,025,837 A | | 2/2000 | Matthews, III et al. |
| 6,028,599 A | | 2/2000 | Yuen et al. |
| 6,072,980 A | * | 6/2000 | Manico et al. .............. 434/317 |
| 6,239,794 B1 | | 5/2001 | Yuen et al. |

FOREIGN PATENT DOCUMENTS

WO        WO9607270 A1     3/1996

* cited by examiner

Primary Examiner—Michael H. Lee
Assistant Examiner—Paulos Natnael
(74) Attorney, Agent, or Firm—Fish & Neave

(57) ABSTRACT

An audio description of a television program, i.e., a sound bite, is reproduced simultaneously with the display of the program at a television receiver. Specifically, the sound bite is embedded in a television signal that contains audio component and a video component. The television signal is transmitted to a plurality of television receivers and intercepted at one of the receivers. The video component is displayed on a monitor and the audio component is reproduced. On command the sound bite is reproduced instead of the audio component. An audio description of a television program, i.e., a sound bite, is also reproduced simultaneously with the display of a program listing of the program at a television receiver. Specifically, when the program listing is marked with an on-screen cursor, the sound bite is reproduced.

20 Claims, 5 Drawing Sheets

FIG.4

| | 11:00 AM | 11:30 AM | 12:00 AM |
|---|---|---|---|
| 2 | JUDGE(PART 1) | JUDGE(PART 2) | AT NOON |
| 4 | GOLDEN GIRLS | NEWS 26 | INSIDE EDITION |
| 5 | YOUNG & RESTLESS 38 | NEWS 26 |
| 7 | PERFECT STRA | LOVING | ALL MY CHILD |
| 9 | SESAME STREET 26 | | |
| 13 | ALL MY CHILDREN | 38 | NEWS 26 |
| 44 | EVERYDAY 26 | | MOVIE |
| A&E | LORNE GREEN'S WORLD OF S | | FUGITIVE |
| CNN | NEWS | | NEWS |
| DIS | DORTHY BRINGS SOPHIA'S SISTER (NANCY WALKER) OVER FROM SICILY AS A BIRTHDAY SURPRISE | | |
| LIF | | | |
| TNT | | | |
| CH 2 | KNTV-FOX | CBL 2 | 11:25A | TUE APR 3 |

SOUND BITE AUGMENTATION

CROSS-REFERENCE TO RELATED APPLICATION

This application is a continuation of application Ser. No. 09/219,574, now U.S. Pat. No. 6,452,640 filed Dec. 24, 1998, which claims the benefit of provisional application Serial No. 60/068,782, filed Dec. 24, 1997, the disclosure of which is incorporated herein by reference.

BACKGROUND OF THE INVENTION

This invention relates to the field of television, and more particularly, to the augmentation of the display of a television program or a television program guide.

For many years, it has been the practice to transmit textual data with a television signal in a teletext or XDS format. At the television receivers, the user has the option of displaying the transmitted textual material instead of the television program. The audio component of the television signal is either reproduced as sound or muted.

SUMMARY OF THE INVENTION

According to one aspect of the present invention, an audio description of a television program, i.e., a sound bite, is reproduced simultaneously with the display of the program at a television receiver. Specifically, the sound bite is embedded in a television signal that contains an audio component and a video component. The television signal is transmitted to a plurality of television receivers and intercepted at one of the receivers. The video component is displayed on a monitor and the audio component is reproduced as sound. On command the sound bite is reproduced instead of the audio component.

According to another aspect of the invention, an audio description of a television program, i.e., a sound bite, is reproduced simultaneously with the display of a program listing of the program at a television receiver. Specifically, when the program listing is marked with an on-screen cursor, the sound bite is reproduced.

BRIEF DESCRIPTION OF THE DRAWINGS

The features of the specific embodiments of the best mode are illustrated in the drawings in which:

FIG. 4 represents a typical television screen in another embodiment of the invention.

DETAIL DESCRIPTION OF THE INVENTION

Figure 1:
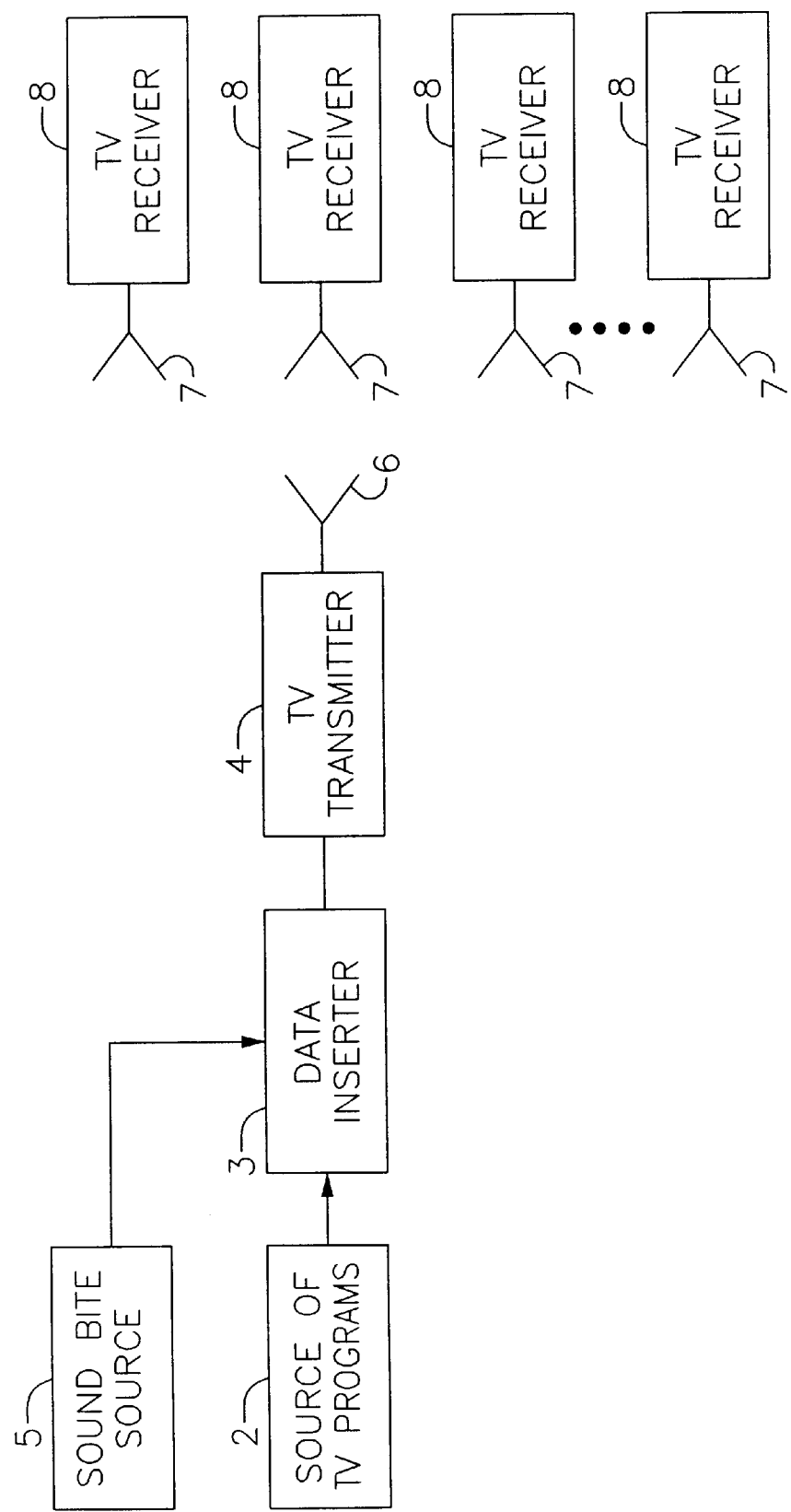
FIG. 1 is a schematic block diagram of a television distribution system incorporating the principles of the invention.

As illustrated in FIG. 1, a source of television (tv) signals 2 is connected by a data inserter 3 to a tv transmitter 4. Source 2 comprises a plurality of audio-video programs. A sound bite source 5 is also connected to data inserter 3 to embed the sound bite data in the tv signal. It should be noted that the sound bites are in addition to the audio component of the tv signal. The sound bite data is preferable in coded digital form such as teletext or XDS format, but alternatively it could be embedded in the tv signal in analog form. In an analog tv signal transmission system, inserter 3 embeds the sound bite data in the VBI of the tv signal. In a digital tv signal transmission system, inserter 3 mixes the sound bite data in the digital data stream with the tv signal.

Transmitter 4 is connected to a cable feed 6 for transmission of the tv signal through a cable network. The cable network has a large number of cable drops 7 each connected to a tv receiver 8 to deliver the tv signal thereto. Alternatively, the tv signal and sound bite data could be transmitted to the tv receivers by wireless terrestrial or satellite links.

In general, the sound bites could be transmitted in different ways. One way is to transmit a single sound bite for each tv program in real time as the tv program is being broadcast. Another way is to transmit a number of different sound bites in a continuously repeating carousel such that the desired sound bite is selectively grabbed from the tv signal for reproduction at a tv receiver. Yet another way is to set up a backlink from each tv receiver 8 to sound bite source 5 (FIG. 1). The backlink could be by telephone, cable, or pager. The sound bites transmitted in the tv signal depend on the command signals sent back by the particular tv receiver. Thus a separate sound bite could be earmarked for each tv receiver.

Figure 2:
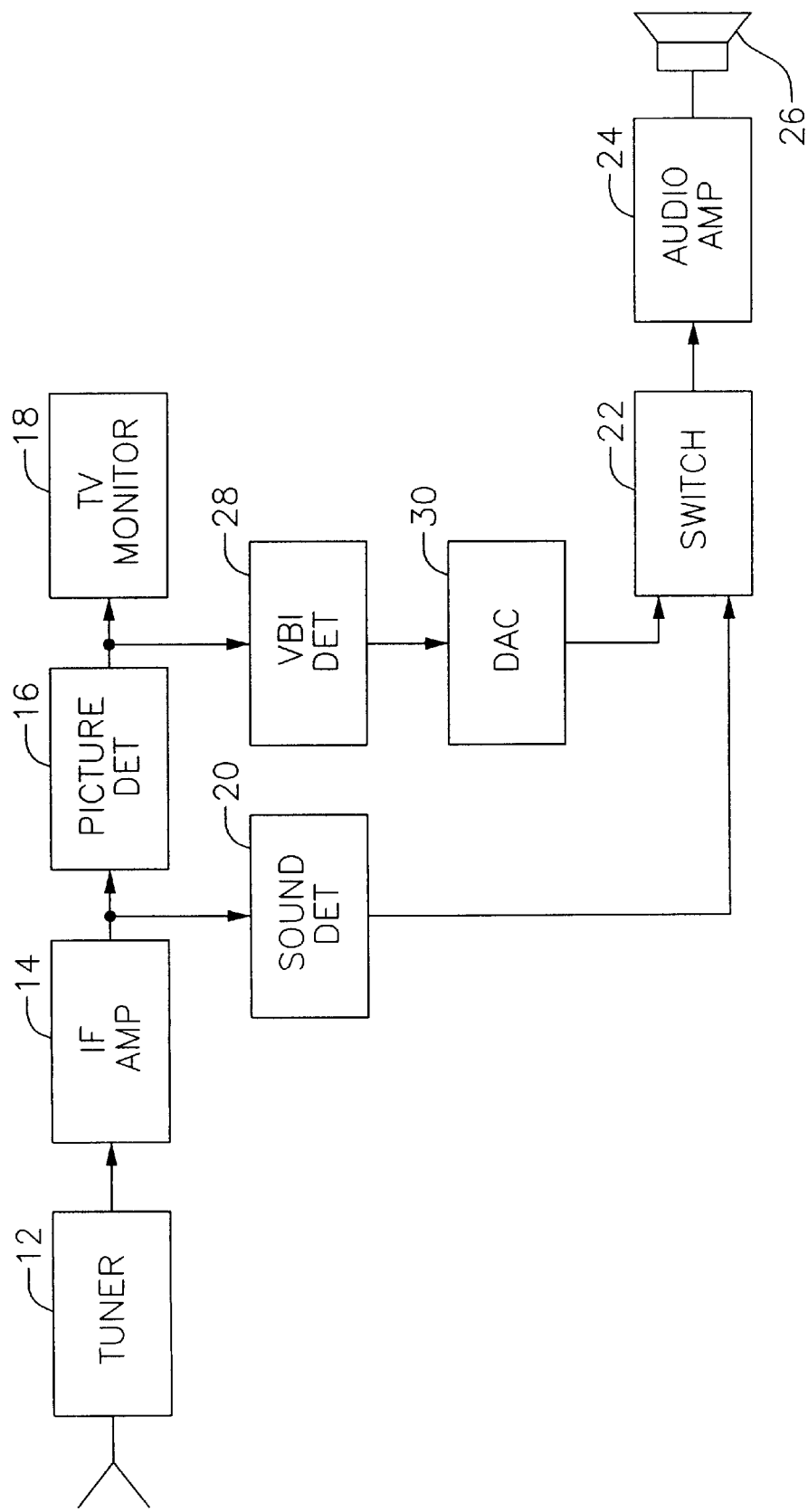
FIG. 2 is a schematic block diagram of one of the television receivers shown in FIG. 1.
Figure 3:
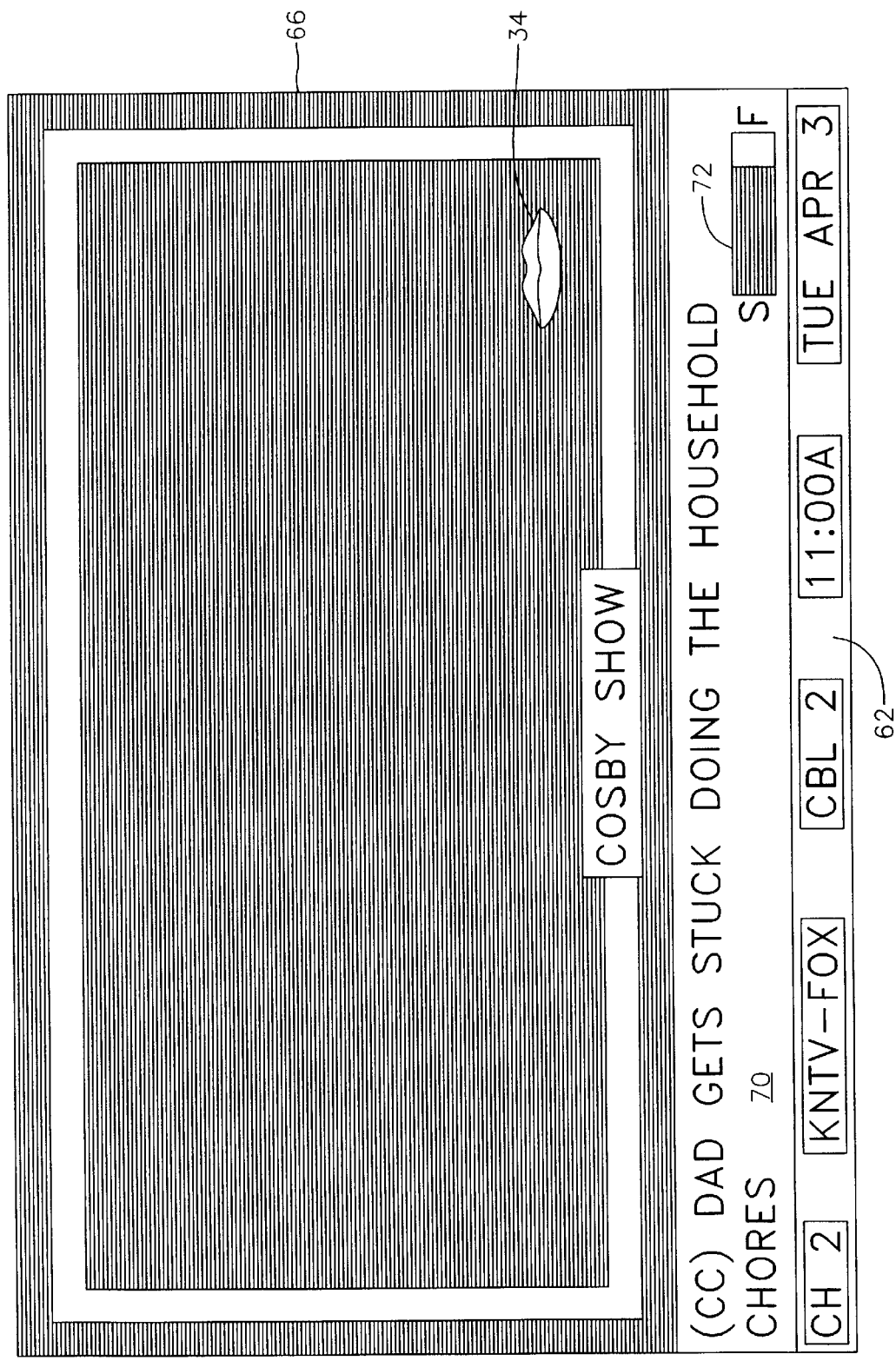
FIG. 3 represents a typical television screen in one embodiment of the invention.

FIG. 2 represents one of tv receivers 8 in an embodiment of the invention that augments display of a television program with a sound bite. Cable drop 7, or other means for intercepting the tv signal, is connected to a tuner 12, which selects the channel to be displayed. Tuner 12 is coupled by an IF amplifier 14 and a picture detector 16 to a TV monitor 18. A sound detector 20 is coupled by a switch 22 to an audio amplifier 24. A speaker 26 reproduces the audio signal from amplifier 24. Digital data is embedded in the tv signal, e.g., in the VBI, as a sound bite. The sound bite is preferably related to the television program. A VBI detector 28 or other means to extract the sound bite data recovers the sound bite and a digital-to-analog converter (DAC) 30 converts the sound bite to an analog signal suitable for reproduction by speaker 26. As illustrated in FIG. 3, an on-screen icon 34, shown as a pair of lips, signals the presence of the sound bite. When the user of the television receiver issues an appropriate command by clicking on the icon or pushing a prescribed key on a controller, switch 22 transmits the output of DAC 30, rather than sound detector 20, to speaker 26. The length of the sound bite depends on the amount of space available in the tv signal for this purpose. If desired, part or all of the sound bite could be stored temporarily at the television receiver before being reproduced.

If a number of different sound bites are transmitted in a carousel, the appropriate sound bite for each particular user could be selectively grabbed. The selective grabbing could be based on a user profile as described in application Serial No. 60/104,008, filed on Oct. 13, 1998, the disclosure of which is incorporated fully herein by reference, or on the location of the tv receiver such as its zip code. In the former case, the reproduced sound bite could be customized to the profile of the user. In the latter case, the reproduced sound bite could be customized to the location of the user so users in different geographic locations receive different sound bites. For example, if the tv program is an advertisement, the sound bite could be the street address of the nearest retail establishment where the advertised product can be purchased. The sound bites are tagged with codes identifying different themes or locations (zip codes), which are compared with a code at each receiver. When a match occurs, the sound bite is reproduced at the particular receiver.

In another embodiment, the invention augments display of a television program guide (EPG). The invention is incorporated into a television schedule system such as disclosed in U.S. Pat. No. 5,353,121, issued on Oct. 4, 1994, the disclosure of which is incorporated fully herein by reference. As illustrated in FIG. 4, upon command a program note 52 is overlaid on a television program guide. Program note 52 relates to the television program highlighted by a cursor 32. As cursor 32 moves, the program note changes accordingly. Sound bites relating to the television programs of the guide are stored in local memory, i.e., RAM. The stored sound bites could be downloaded with the EPG data on a regular basis. On-screen icons 38 are located in the cells of programs that have sound bites. When such a cell is highlighted, the user can issue a command, i.e., by clicking on the icon, to reproduce the sound bite, either instead of a program note 52 or in addition to program note 52.

Figure 5:
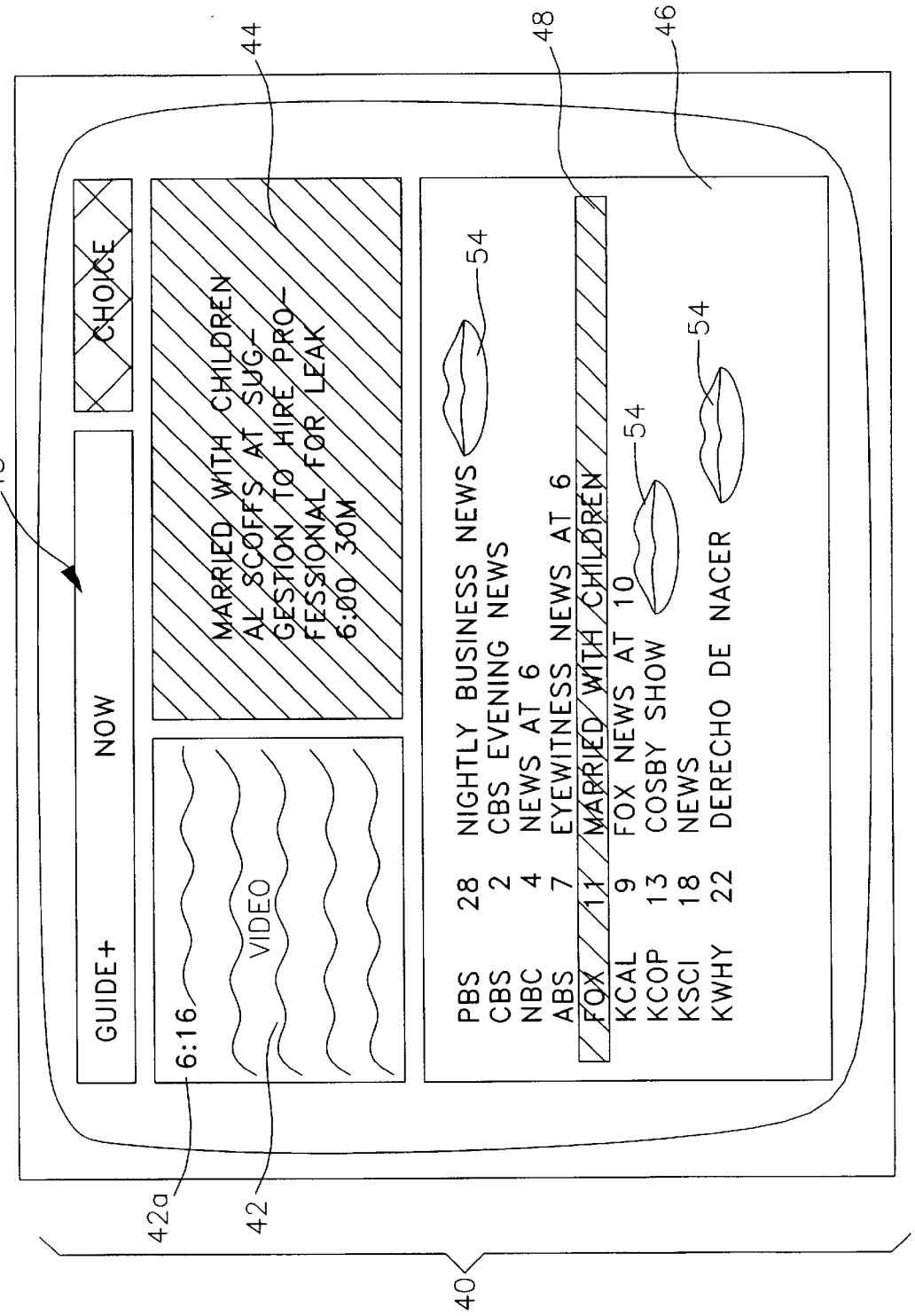
FIG. 5 represents a typical television screen in yet another embodiment of the invention.

In another embodiment, the invention augments display of another television program guide (EPG). The invention in incorporated into apparatus for displaying television programs and related text such as disclosed in PCT International Application WO96/07270, published on Mar. 7, 1996, the disclosure of which is incorporated fully herein by reference. As illustrated in FIG. 5, a detail window 44 is permanently displayed as part of a television program guide. The description in detail window 44 relates to the television program highlighted by a cursor 48. As cursor 38 moves, the description changes accordingly. Sound bites relating to the television programs of the guide are stored in local memory, i.e., RAM On-screen icons 54 are located in the cells of programs that have sound bites. When such a cell is highlighted, the user can issue a command, i.e., by clicking on the icon, to reproduce the sound bite, either instead of a program description or in addition to a program description.

To increase the capacity to reproduce sound bites with the highlighted cells of an EPG, a backlink could be utilized. When the viewer at a tv receiver clicks on the icon, a command is sent on a dedicated backlink channel to the sound bite source with a tag identifying the program displayed in the highlighted cell and the particular tv receiver. The sound bite is sent in a dedicated channel either with or without a tv signal. Along with the sound bite is a tag identifying the particular tv receiver so the sound bite is selectively grabbed only by that receiver.

Instead of clicking on an icon as described above, a microprocessor could be programmed to initiate a sound bite in the EPG when an on-screen cursor is moved to a cell that has an available sound bite and remains there for a prescribed period of time.

Another alternative is to provide a completely audio guide. While the user is watching television, the user can navigate about the screen with a cursor. In essence there is an invisible grid of cells with boundary lines, as in an EPG. As the cursor moves across an invisible boundary line, an audible signal such as a beep is given. In this way, the user can tell where he or she is in the guide while continuing to watch television full screen. When the cursor moves into a cell that has a sound bite, a different audible signal is given. If the cursor remains in the cell for a prescribed period of time, the sound bite is reproduced.

The content of the sound bites can be designed to elicit information from the television viewer from which a viewer profile can be developed. For example, the sound bites could be questions requiring yes or no answers about the television program being displayed or the program listing being highlighted in the EPG. The answers could be made by pressing specific keys on a remote controller or verbally, if speech recognition software is provided. Reference is made to a provisional application of Serial No. 60/110,01, filed on Nov. 30, 1998, entitled "Smart Agent Based on Habit, Statistical Inference, and Psycho-demographic Profiling", for a description of the types of questions that might be asked and the way the profile might be generated.

What is claimed is:

1. A method for augmenting the viewing of a live telecast television program comprising:

embedding a sound bite component in a VBI of a television signal, the television signal including an audio component, and a video component in a television signal;

telecasting the television signal;

receiving the telecast television signal by a television;

displaying the video component on a television screen;

reproducing the audio component by the television;

displaying an icon indicating the presence of the sound bite component in the received telecast signal simultaneous with the displayed video component on the television screen;

activating the displayed icon by a television viewer;

extracting the sound bite from the received television signal responsive to activation of the displayed icon; and reproducing the sound bite instead of the audio component by the television.

2. The method of claim 1, wherein the sound bite is related to an advertisement.

3. The method of claim 2, wherein the advertisement is related to the live telecast television program being viewed by the television viewer.

4. The method of claim 1, wherein the sound bite is related to a user profile.

5. The method of claim 4, wherein the reproduced sound bite is customized according to the user profile.

6. The method of claim 1, wherein the sound bite is tagged with codes identifying different themes for television programs.

7. The method of claim 1, wherein the sound bite is tagged with codes identifying different locations.

8. The method of claim 1, further comprising storing at least part of the sound bite at the television before the sound bite is reproduced.

9. The method of claim 1, wherein the sound bite is related to a single advertisement for a particular geographic location.

10. A system for augmenting the viewing of a live telecast television program comprising:

a data inserter to embed a sound bite component in a VBI of a television signal, the television signal including, an audio component, and a video component in a television signal;

a transmitter to telecast the television signal;

a television tuner to receive the telecast television signal;

a television screen to display the video component of the received telecast television signal;

a sound detector to reproduce the audio component at the television;

means for displaying an icon indicating the presence of the sound bite component in the received telecast signal simultaneous with the displayed video component on the television screen;

a user input device to activate the displayed icon by a television viewer;

a signal extractor to extract the sound bite from the received television signal responsive to activation of the displayed icon; and a digital to analog converter to reproduce the sound bite instead of the audio component by the television.

11. The system of claim 10, wherein the sound bite is related to an advertisement.

12. The system of claim 11, wherein the advertisement is related to the live telecast television program being viewed by the television viewer.

13. The system of claim 10, wherein the sound bite is related to a user profile.

14. The system of claim 13, further comprising means for customizing the reproduced sound bite according to the user profile.

15. The system of claim 10, further comprising means for tagging the sound bite with codes identifying different themes for television programs.

16. The system of claim 10, further comprising means for tagging the sound bite with codes identifying different locations.

17. The system of claim 10, further comprising a memory to store at least part of the sound bite at the television before the sound bite is reproduced.

18. The system of claim 10, wherein the sound bite is related to a single advertisement for a particular geographic location.

19. A method for transmitting a sound bite with a live telecast television program comprising:

embedding a sound bite component in a VBI of a television signal, the television signal including, an audio component, and a video component in a television signal;

receiving the telecast television signal by a television;

displaying the video component on a television screen;

reproducing the audio component by the television;

displaying an icon indicating the presence of the sound bite component in the received telecast signal simultaneous with the displayed video component on the television screen;

activating the displayed icon by a television viewer;

extracting the sound bite from the received television signal responsive to activation of the displayed icon; and reproducing the sound bite in addition to the audio component by the television.

20. The method of claim 19, wherein the sound bite is related to an advertisement.

* * * * *